Figure 1:
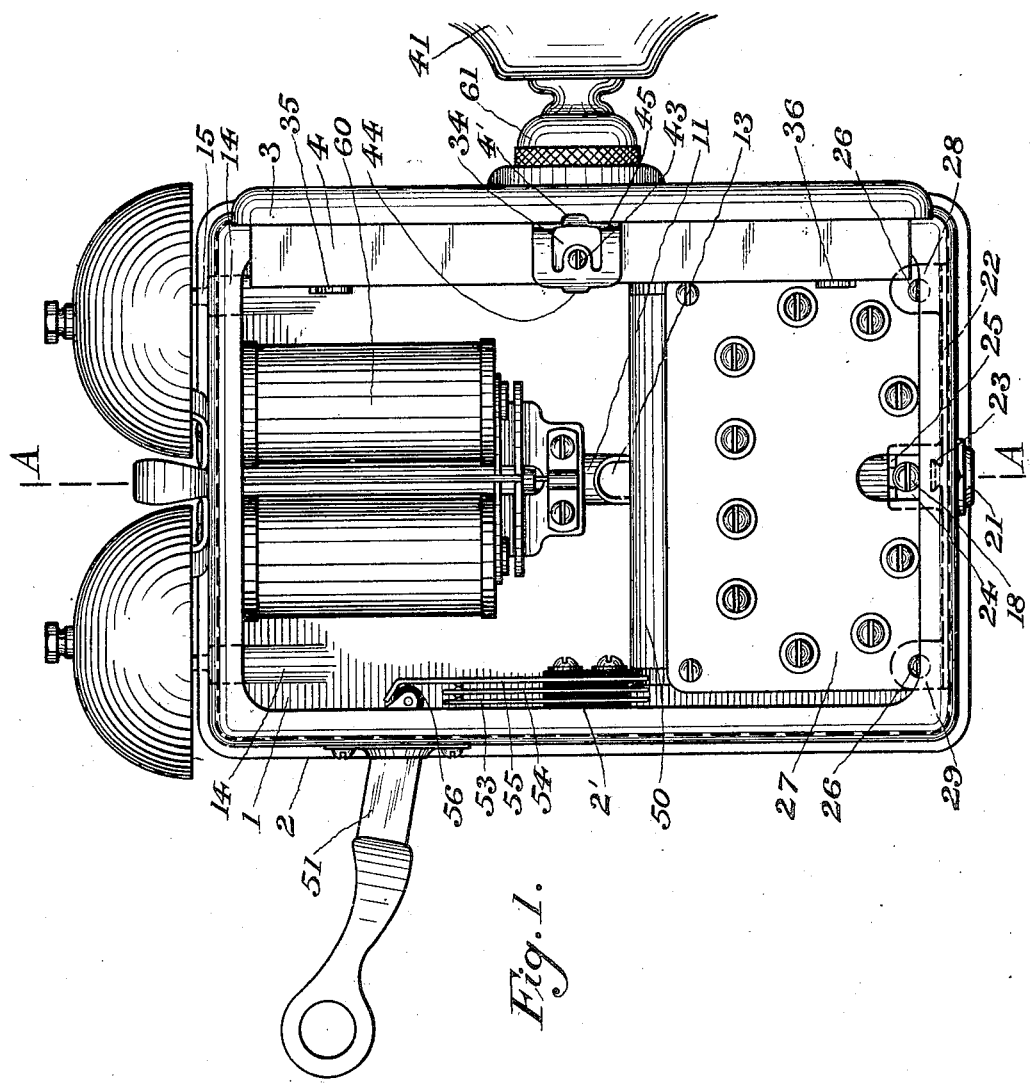

J. A. BIRSFIELD.
TELEPHONE SUBSTATION SET.
APPLICATION FILED NOV. 20, 1906.

902,641.

Patented Nov. 3, 1908.

2 SHEETS—SHEET 1.

Witnesses:

Jules A. Birsfield,
Inventor.

by McMeen & Miller
Attorneys.

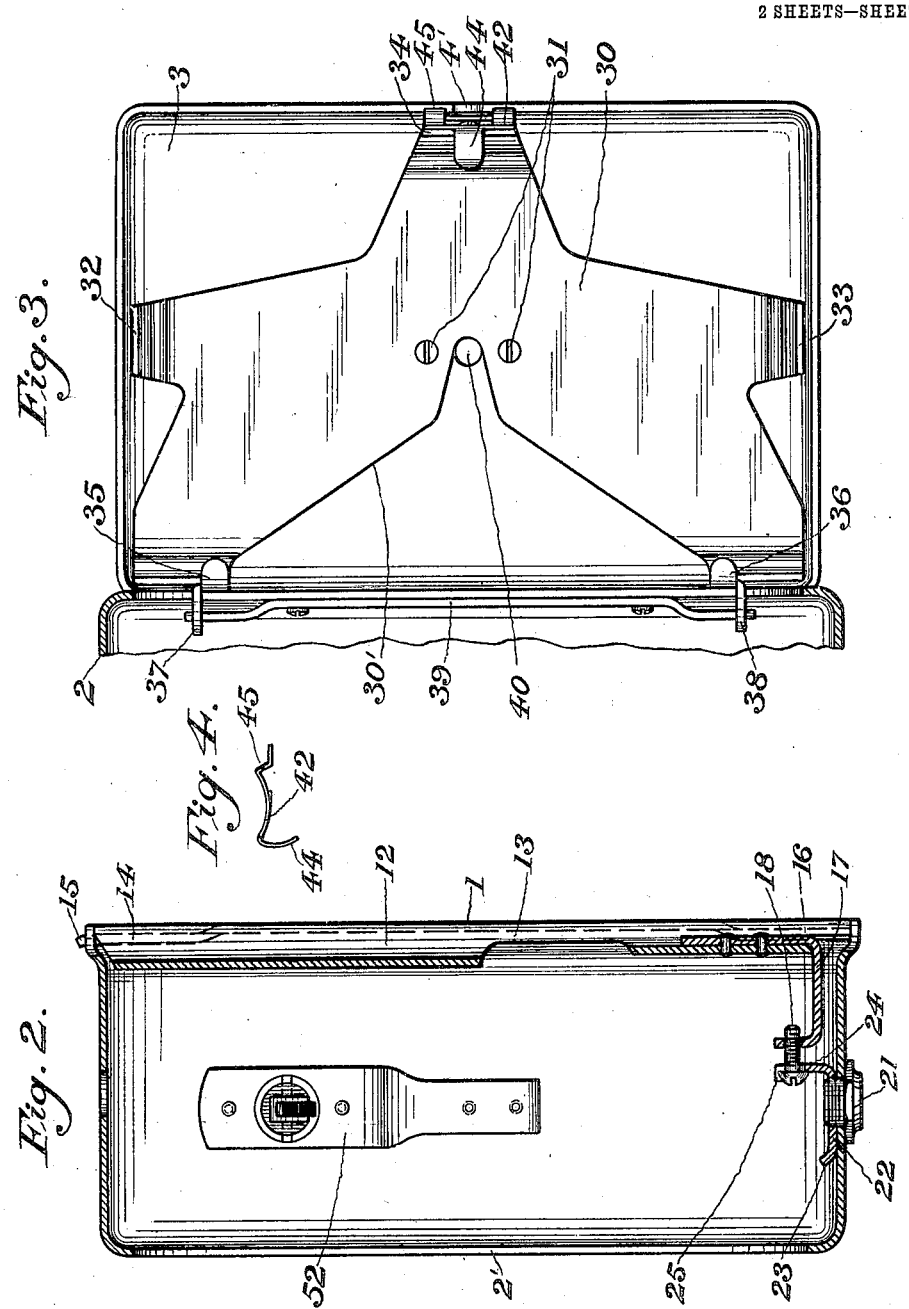
J. A. BIRSFIELD.
TELEPHONE SUBSTATION SET.
APPLICATION FILED NOV. 20, 1906.
902,641.
Patented Nov. 3, 1908.
2 SHEETS—SHEET 2.

UNITED STATES PATENT OFFICE.

JULES A. BIRSFIELD, OF CHICAGO, ILLINOIS, ASSIGNOR TO ALFRED STROMBERG, OF CHICAGO, ILLINOIS.

TELEPHONE SUBSTATION SET.

No. 902,641.  Specification of Letters Patent.  Patented Nov. 3, 1908.

Application filed November 20, 1906. Serial No. 344,226.

*To all whom it may concern:*

Be it known that I, JULES A. BIRSFIELD, a citizen of the United States of America, and a resident of Chicago, county of Cook, and State of Illinois, have invented a new and useful Improvement in Telephone Substation Sets, of which the following is a specification.

My invention pertains to the construction of telephone sets for installation at the substations of a telephone exchange, and has as its object the production of an improved set for the purpose described. To this end, I provide a case of sheet metal, simply assembled, and containing within it and upon it all the elements going to make up a complete telephone substation equipment.

My invention lies in the several details whereby the telephone set as a whole is constructed.

In the drawings, Figure 1 displays the complete set in elevation, with the door open, conductors being omitted to simplify the drawing. Fig. 2 shows a sectional view on the line A—A of Fig. 1, the terminal table 27, the induction coil 50, the ringer 60 and parts of the hook switch being omitted to enable the remaining parts to be more clearly shown; Fig. 3 shows an elevation of the inside of the door of Fig. 1, the unnecessary portions of the case part being broken away, and the condenser 4 being removed to reveal the means whereby it is mounted upon the door; Fig. 4 is a detail of the latch.

The inclosing case of the substation set is composed of three parts, the base 1, the box 2 and the door 3. The base 1 is a flat piece of metal having the central rib 11 on its inner surface and the central groove 12 on its outer surface; in the rib is cut the opening 13 permitting access from the groove 12 to the inside of the assembled case. Upon the base 1 are two ribs 14 14 each having a projecting tongue 15; there are also two ribs 16 without projecting tongues. A strip of sheet metal 17 is bent to the shape shown and riveted to the base plate 1, the upper end of the piece 17 being tapped for a screw 18; the body of the part 17 is to a large degree flexible because of its limited thickness.

The box 2 is pressed of sheet metal and is provided with the necessary openings for the mounting of the divers parts of apparatus, as the ringer, switch, etc. It has also two slots in the upper portion to register with the two tongues 15 15 and the tongues 15 15 pass through the slots in the case to hold the two parts together. In the lower portion of the box 2 is the hole for the screw-threaded bushing 21 which engages threads in a structural part 22 and holds the part 22 rigidly upon the inside of the box 2. The bushing 21 gives access of the receiver cord into the case. The part 22 has a projecting tongue 23 affording a projection to which may be attached the anchor cord of the receiver cord passing through the bushing 21; the part 22 has formed up from it the locking projection 24, which is bifurcated at its outer end to pass on either side of the screw 18, the bifurcated end being turned up in lugs 25 25 preventing the head of the screw 18 from slipping out after it is once in position; the part 22 has also two projecting lugs, in line with the projection 24, which receive the screws 26 26 and serve to mount the insulating terminal table 27. The locking of the box to the base is accomplished, therefore, by starting the screw 18 in the arm 17; then by placing the box 2 above its proper position and moving it downwardly so that the holes in its upper portion pass over the tongues 15 15 and the upper edge of the box is held against removal by those tongues; then by swinging the box upon those tongues as a fulcrum until the box is in its proper position, the screw 18 being sprung out of position as permitted by the elasticity of the arm 17 to permit the locking lug 24 to pass into position; when the box 2 is thus in place, the arm 17 will bring the screw 18 back into its normal position, and the screw 18 then may be turned down into the position shown in Fig. 2, the head of the screw engaging the locking lug 24 and being prevented from slipping out of engagement by the upturned lugs 25 25. The ribs 16 assist in the alinement of the box 2 upon the base 1.

The door 3 is formed of a single piece of metal and has attached to its inner surface the structural part 30. The part 30 is attached to the door by means of the screws 31 31; it has two lugs 32 33 at top and bottom edges to control the location of the condenser 4 which is to be mounted in the door; also lug 34 for the same purpose; also lugs 35 and 36 for the same purpose, the lugs 35 and 36 not only projecting upward from the inner surface of the door as do the lugs previously mentioned, but also turning back in hooklike form to grasp and hold a condenser when the edge of the condenser is slipped under them. From the sides of the lugs 35 and 36 are turned out the hinge lugs 37 and 38, each of which is perforated for the end of the hinge bar 39. By the attachment of the part 30 to the door 3 and by the attachment of the hinge bar 39 to the box 2, the door is hinged to the box 2. By the conformation of the edge 30' as shown, clearance under the condenser is provided for the flexible conductors leading through the hole 40 to the transmitter 41 mounted upon the outer surface of the door.

Upon the lug 34 is mounted the combination spring latch and condenser clamp 42 by means of the screw 43 passing into the lug 34. This spring clip has a projection 44 which clamps the edge of the condenser 4 after the alternate edge of the condenser has been placed under the lugs 35 and 36, thus holding the condenser securely in place. The shoulder 45 of the latch 42 engages the under surface of the edge at 2' of the box 2 and thus holds the door locked closed when the door is pushed into a closed position. By the recess 4' in the edge of the door 3, a small screwdriver or small rigid projection of any nature, may be pressed against the latch 42 and the latch thus may be pressed out of contact with the edge of the box 2 and the door thus be unlocked and permitted to open.

The induction coil 50, mounted upon the base 1, serves to support the upper edge of the terminal table 27, the two parts being united by two screws. Upon the terminal table 27 are mounted terminals of any desired type, and to these terminals are brought all the conductors associated with the telephone set, the receiver cord conductors being brought through the bushing 21, the line and ground conductors being brought through the groove 12 in the base 1 and then through the opening 13, and the remaining conductors, local to the telephone set, being run as desired within the box, flexible conductors being used to the condenser upon the inner surface of the door and to the transmitter upon the outer surface of the door.

The switch hook 51 is mounted pivotally in the plate 52, upon which are mounted the switch springs 53, 54 and 55; the insulating roller 56 engages one of these springs and thus provides for isolating the springs from each other when the receiver is hung upon the switch hook.

The ringer 60 is of a type forming the subject matter of my application, Serial Number 344,227 filed November 20, 1906. The transmitter bracket 61 is of a type forming the subject matter of my application, Serial Number 364,988 filed March 28, 1907.

Having thus described my invention, what I claim as new and desire to protect by United States Letters Patent is:

1. In a telephone substation set a structural element adapted to attach to the inner surface of the door and comprising a sheet of metal upon which are formed projections to serve as one element of a hinge joint, as lugs for retaining a condenser, and as a lug for mounting a spring latch for holding the door in a closed position substantially as described.

2. In a telephone substation set a structural element comprising a sheet of metal from which are formed lugs for holding a terminal table, for holding an anchor cord, and forming one element of a case lock, substantially as described.

3. In a telephone substation set a box, a structural element inside said box and bearing a lug to receive an anchor cord, and a screw threaded bushing passing through said box taking seat upon said box and engaging screw threads in said structural part whereby said structural part is held in position and whereby said three parts are clamped together, said bushing having an opening for the passage into said box of said anchor cord and associate conductors, substantially as described.

4. In a telephone substation set a hinge comprising first a strap of metal having two projecting fingers and attached to the box of the telephone substation set, and second an element having two lugs with perforations engaging said two fingers respectively and having additional lugs for supporting a condenser, substantially as described.

5. In a telephone substation set a base plate having at one end projecting tongues and at the other end a projecting flexible arm; a box member having at one end holes to register with said tongues and at the other end a projecting bifurcated lug; and a screw forming an adjustable lock member between the flexible arm and the bifurcated lug and between said base and said box substantially as described.

6. In a telephone substation set a tongue-and-hole engagement between a box and a base at one portion of the base; a locking engagement between them at another portion of the base and consisting of a lug on the box clamped under the head of a screw associated with the base; and means for permitting the screw head to be moved aside to allow the removal of the box when the screw is loosened substantially as described.

7. In a telephone substation set, a box; a door; a latch spring for holding said door closed, said latch spring having a projecting lock to clamp and retain a condenser, substantially as described.

8. In a telephone substation set, a box, a door for said box, a latch spring borne upon the door, having shoulders to engage the edge of the box, having an exposed surface when the door is closed whereby the spring may be operated to release the door and having a projecting lug for clamping additional apparatus upon the door substantially as described.

Signed by me at Chicago, county of Cook and State of Illinois, in the presence of two witnesses.

JULES A. BIRSFIELD.

Witnesses.
HARRIET L. SMITH,
DAVID S. HULFISH.